United States Patent
Graziosi

(10) Patent No.: US 11,501,507 B2
(45) Date of Patent: Nov. 15, 2022

(54) MOTION COMPENSATION OF GEOMETRY INFORMATION

(71) Applicant: SONY CORPORATION, Tokyo (JP)

(72) Inventor: Danillo Graziosi, San Jose, CA (US)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 16/234,133

(22) Filed: Dec. 27, 2018

(65) Prior Publication Data
US 2019/0392651 A1   Dec. 26, 2019

Related U.S. Application Data

(60) Provisional application No. 62/690,051, filed on Jun. 26, 2018.

(51) Int. Cl.
| G06T 19/20 | (2011.01) |
| G06T 13/20 | (2011.01) |
| G06T 9/00 | (2006.01) |
| H04N 19/537 | (2014.01) |
| H04N 19/54 | (2014.01) |
| H04N 19/543 | (2014.01) |
| H04N 19/51 | (2014.01) |

(52) U.S. Cl.
CPC .......... *G06T 19/20* (2013.01); *G06T 13/20* (2013.01); *G06T 9/00* (2013.01); *G06T 2210/12* (2013.01); *G06T 2219/2004* (2013.01)

(58) Field of Classification Search
CPC ......... G06T 13/20; G06T 17/20; G06T 19/20; G06T 2210/12; G06T 2219/2004; G06T 9/00; H04N 19/51; H04N 19/537; H04N 19/54; H04N 19/543
See application file for complete search history.

(56) References Cited

U.S. PATENT DOCUMENTS

| 5,911,008 A | * | 6/1999 | Niikura | H04N 19/577 |
| | | | | 348/E5.067 |
| 2005/0169543 A1 | * | 8/2005 | Damera-Venkata | H04N 19/51 |
| | | | | 375/E7.11 |
| 2012/0183069 A1 | * | 7/2012 | Peng | H04N 19/583 |
| | | | | 375/E7.243 |

FOREIGN PATENT DOCUMENTS

| EP | 3 301 930 A1 | 4/2018 |
| JP | H09271027 A | 10/1997 |
| JP | 2009182605 A | 8/2009 |
| WO | 2017154045 A1 | 9/2017 |
| WO | WO-2017154045 A1 * | 9/2017 | ............. G06T 7/579 |

OTHER PUBLICATIONS

Cedric Cagniart et al., "Free-form mesh tracking: A patch-based approach," 2010 IEEE Conference on Computer Vision and Pattern Recognition (CVPR), Jun. 13-18, 2010, p. 1339-1346 (Year: 2010).*

(Continued)

*Primary Examiner* — Sing-Wai Wu
(74) *Attorney, Agent, or Firm* — Haverstock & Owens, A Law Corporation

(57) ABSTRACT

A method of motion compensation for geometry representation of 3D data is described herein. The method performs motion compensation by first identifying correspondent 3D surfaces in time domain, then followed by a 3D to 2D projection of motion compensated 3D surface patches, and then finally performing 2D motion compensation on the projected 3D surface patches.

19 Claims, 6 Drawing Sheets

(56) References Cited

OTHER PUBLICATIONS

Marco Munderloh et al., "Mesh-based global motion compensation for robust mosaicking and detection of moving objects in aerial surveillance," Computer Vision and Pattern Recognition Workshops (CVPRW), 2011 IEEE Computer Society Conference (Year: 2011).*

Jian Wang et al., "Depth-aware Template Tracking for Robust Patient Motion Compensation for Interventional 2-D/3-D Image Fusion," 2013 IEEE Nuclear Science Symposium and Medical Imaging Conference (2013 NSS/MIC), IEEE Xplore: Jun. 12, 2014 (Year: 2014).*

Seung-Ryong Han, "3D Video Compression Based on Extended Block Matching Algorithm", 1-4244-0481, pp. 525-528, IEEE, International Conference on Image Processing (ICIP) 2006.

Toshihiko Yamasaki, "Patch-Based Compression for Time-Varying Meshes", Proceedings of 2010 IEEE 17th International Conference on Image Processing, Sep. 26-29, 2010, pp. 3433-3436, 978-1-4244-7994-8.

Alexandros Doumanoglou, "Toward Real-Time and Efficient Compression of Human Time-Varying Meshes", IEEE Transactions on Circuits and System for Video Technology, vol. 24, No. 12, Dec. 2014, pp. 2099-2116.

Hossein Bakhshi Golestani, "Point Cloud Estimation for 3D Structure-Based Frame Prediction in Video Coding", Jul. 10-14, 2017, Proceedings of the IEEE International Conference on Multimedia and Expo (ICME)2017, 978-1-5090-6067, pp. 1267-1272.

Zhang Dejun,"[PCC] TMC2 CE2.6 Report on Temporally consistent Patch packing", ISO/IEC JTC1/SC29/WG11 MPEG2018/m42712, Apr. 2018, San Diego, US, pp. 1-7.

Zhang Dejun et al., "PCC TMC2 CE2.6 Report m42712", Huawei Technologies Co., Ltd., 2011, pp. 1-12.

Cedric Cagniart et al., "Free-Form Mesh Tracking: a Patch-Based Approach", 2010 IEEE Computer Society Conference on Computer Vision and Pattern Recognition, Jun. 18, 2010.

Jian Wang et al., "Depth-aware template tracking for robust patient motion compensation for interventional 2-D/3-D image fusion", 2013 IEEE NSS/MIC, Jun. 12, 2014.

Marco Munderloh et al., "Mesh-based global motion compensation for robust mosaicking and detection of moving objects in aerial surveillance", Computer Vision and Pattern Recognition Workshops (CVPRW), 2011 IEEE Computer Society Conference On, IEEE, Jun. 20, 2011, pp. 1-6.

Ohji Nakagami et al., Point cloud compression technology proposal by Sony, 120. MPEG Meeting; Oct. 23, 2017-Oct. 27, 2017; Macau, MPEG, No. m41665, Oct. 18, 2017.

"PCC Test Model Category 2 v0", 120. MPEG Meeting; Oct. 23, 2017-Oct. 27, 2017; Macau, MPEG, No. N17248, Dec. 15, 2017.

International Search Report and Written Opinion of PCT International Application No. PCT/IB2019/054885 dated Oct. 8, 2019.

SeungRyong Han, Toshihiko Yamasaki, Kiyoharu Aizawa, "Compression of 3D Video Using 3D Block Matching Algorithm", IEICE Technical Report, Japan, Institute of Electronics, Information and Communication Engineers, Jun. 24, 2005, and vol. 105 No. 161—[ pp. 13-18].

* cited by examiner

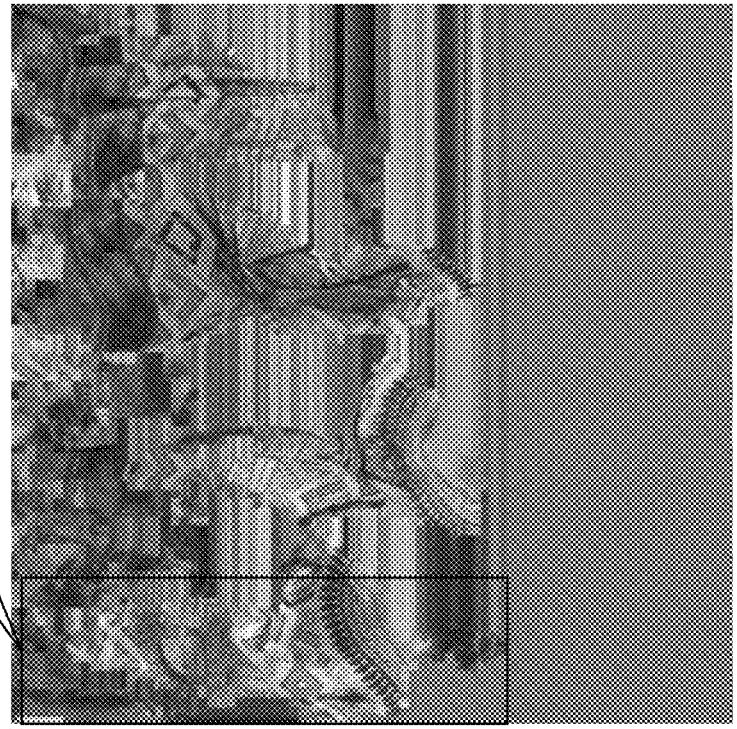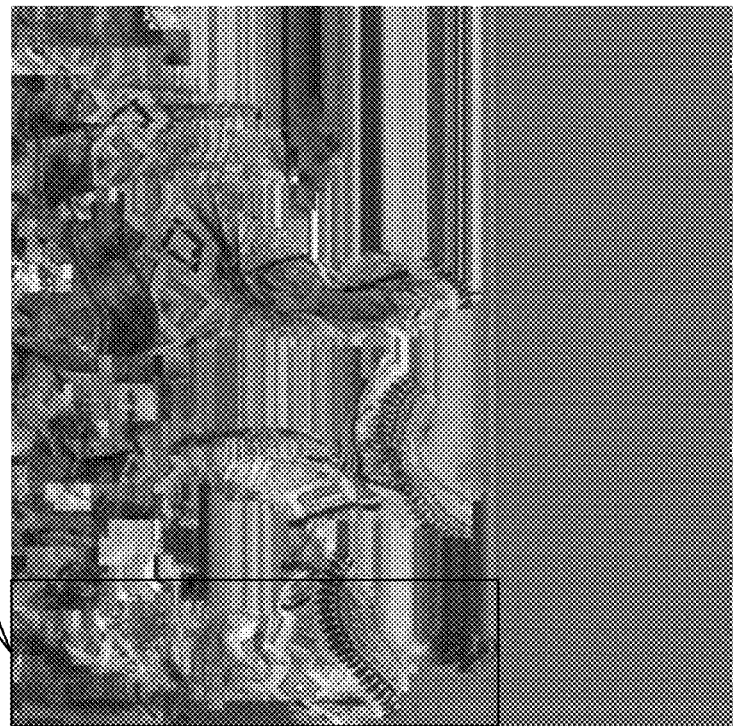
Fig. 3

MOTION COMPENSATION OF GEOMETRY INFORMATION

CROSS-REFERENCE TO RELATED APPLICATION(S)

This application claims priority under 35 U.S.C. § 119(e) of the U.S. Provisional Patent Application Ser. No. 62/690,051, filed Jun. 26, 2018 and titled, "MOTION COMPENSATION OF GEOMETRY INFORMATION," which is hereby incorporated by reference in its entirety for all purposes.

FIELD OF THE INVENTION

The present invention relates to three dimensional graphics. More specifically, the present invention relates to motion compensation of three dimensional graphics.

BACKGROUND OF THE INVENTION

Current coding of time-varying 3D geometry data utilizes a motion modeling stage that requires geometry tracking, which is computationally heavy and may be prone to errors due to topology changes and fast motion.

Others have attempted different methods to perform motion compensation of 3D geometry information. However, these solutions have significant downsides that make them undesirable.

1. The MPEG standard for coding of animated meshes (FAMC) performs motion modeling and motion compensation of registered meshes only, which means that a mesh tracking stage is necessary, and problems such as topology changes and fast motion can prevent the motion module from performing correct mesh tracking.

2. (Academia) The method in [Yamasaki et. al., ICIP 2010] utilizes patch-based motion compensation, but does not utilize 3D to 2D projections, so the individual patch correspondence information needs to be explicitly sent in the bitstream. The method by [Doumanoglou et. al., IEEE CSVT 2014] does not utilize patches but uses skinning models for mesh segmentation. That method also requires a previous bone tracking for motion compensation, which might not be available.

3. (Industry) The point cloud coding standard currently being developed by MPEG uses patches for coding 3D points, and in [m42712, MPEG121 meeting], a method for temporal consistent patch packing was proposed. However, the correspondence between patches utilizes 2D projected surfaces and normal directions, which is not reliable, and does not compensate for the patch 3D motion.

SUMMARY OF THE INVENTION

A method of motion compensation for geometry representation of 3D data is described herein. The method performs motion compensation by first identifying correspondent 3D surfaces in time domain, followed by a 3D to 2D projection of motion compensated 3D surface patches, and then finally performing 2D motion compensation on the projected 3D surface patches.

In one aspect, a method programmed in a non-transitory memory of a device comprises generating 3D patches from a 3D geometry, determining corresponding 3D patches between time instances, implementing 3D matched patch motion compensation using the corresponding 3D patches, projecting the corresponding 3D patches onto a 2D canvas image and implementing 2D motion compensation using a sequence of 2D canvas images. Generating the 3D patches includes determining points connected on a surface of the 3D geometry. Determining corresponding 3D patches between time instances includes identifying temporal correspondences between patches by evaluating a volume intersection of a cube created by a 3D bounding box of each 3D patch. Implementing 3D matched patch motion compensation includes positioning the corresponding 3D patches on a UV map in a location to compensate for motion. Projecting the 3D patches onto the 2D canvas includes placing the corresponding 3D patches onto the 2D canvas so that the matching coordinates in 3D correspond to the same location in 2D after projection. The similarity of correspondent patch data is increased by adjusting a depth of a 3D patch. After implementing the 3D matched patch motion compensation and implementing the 2D motion compensation a motion compensated 3D geometry is established.

In another aspect, an apparatus comprises a non-transitory memory for storing an application, the application for: generating 3D patches from a 3D geometry, determining corresponding 3D patches between time instances, implementing 3D matched patch motion compensation using the corresponding 3D patches, projecting the corresponding 3D patches onto a 2D canvas image and implementing 2D motion compensation using a sequence of 2D canvas images and a processor coupled to the memory, the processor configured for processing the application. Generating the 3D patches includes determining points connected on a surface of the 3D geometry. Determining corresponding 3D patches between time instances includes identifying temporal correspondences between patches by evaluating a volume intersection of a cube created by a 3D bounding box of each 3D patch. Implementing 3D matched patch motion compensation includes positioning the corresponding 3D patches on a UV map in a location to compensate for motion. Projecting the 3D patches onto the 2D canvas includes placing the corresponding 3D patches onto the 2D canvas so that the matching coordinates in 3D correspond to the same location in 2D after projection. The similarity of correspondent patch data is increased by adjusting a depth of a 3D patch. After implementing the 3D matched patch motion compensation and implementing the 2D motion compensation a motion compensated 3D geometry is established.

In another aspect, a system comprises a generation module configured for generating 3D patches from a 3D geometry, a corresponding module configured for determining corresponding 3D patches between time instances, a 3D matched motion compensation module configured for implementing 3D matched patch motion compensation using the corresponding 3D patches, a projection module configured for projecting the corresponding 3D patches onto a 2D canvas image and a 2D motion compensation module configured for implementing 2D motion compensation using a sequence of 2D canvas images. Generating the 3D patches includes determining points connected on a surface of the 3D geometry. Determining corresponding 3D patches between time instances includes identifying temporal correspondences between patches by evaluating a volume intersection of a cube created by a 3D bounding box of each 3D patch. Implementing 3D matched patch motion compensation includes positioning the corresponding 3D patches on a UV map in a location to compensate for motion. Projecting the 3D patches onto the 2D canvas includes placing the corresponding 3D patches onto the 2D canvas so that the matching coordinates in 3D correspond to the same location in 2D after projection. The similarity of correspondent patch data is increased by adjusting a depth of a 3D patch. After implementing the 3D matched patch motion compensation and implementing the 2D motion compensation a motion compensated 3D geometry is established.

BRIEF DESCRIPTION OF THE DRAWINGS

FIG. 3 illustrates a diagram of 3D matched patch motion compensation according to some embodiments.

DETAILED DESCRIPTION OF THE PREFERRED EMBODIMENT

A method of motion compensation for geometry representation of 3D data, such as point clouds, meshes, or similar 3D structures is described herein. A novel method is utilized to perform motion compensation by first identifying correspondent 3D surfaces in time domain, followed by a 3D to 2D projection of motion compensated 3D surface patches, and then finally performing 2D motion compensation on the projected 3D surface patches. By implementing motion compensation, it is possible to compress the 3D data. For example, instead of sending repeated, full sets of point clouds, a first point cloud is sent, and then motion information of the first point cloud is sent, which is much less information than repeated, full sets of point clouds.

Compression of time-varying data usually utilizes a motion compensation stage to increase data correspondence across time domain and provides a more efficient coding. In the case of 3D geometry data, the motion compensation is usually done by modeling the motion of 3D points correspondent in time, which requires a computationally intensive mesh tracking block to identify points correspondences. Furthermore, the mesh tracking stage is prone to errors due to topology changes and fast motion.

Described herein, 3D geometry motion compensation is done without the need of a prior geometry tracking stage. For each time instance, the geometry is segmented into 3D surface patches. A novel technique identifies correspondent surface patches across time. The correspondent patches are motion compensated, and then all patches are projected into a 2D canvas surface. Since the first two stages might not be able to fully capture the geometry motion, a final 2D motion compensation stage is applied to the sequence of 2D canvas images.

Utilization of 3D surface correspondence along with 3D surface motion compensation and 2D projected patches motion compensation represents a novel technique never applied before. This technique is able to provide bitrate savings when coding temporally varying geometry information. Furthermore, this technique does not require the tracking of geometry information to perform motion compensation.

In some embodiments, the 3D geometry is represented as a collection of orthogonal projections of patches of the object's surface, which are used for 3D motion compensation. In some embodiments, temporal correspondences between patches are identified by evaluating the volume intersection of the cube created by the 3D bounding box of each patch. In some embodiments, the corresponding patches are placed in a 2D canvas image so that the matching coordinates in 3D correspond to the same location in 2D after projection. In some embodiments, the similarity of correspondent patch data is increased by adjusting the depth of the patch (similar to adjusting the luminance level of the 2D projected patch). In some embodiments, a sequence of 2D canvas images with projected patches is further 2D motion compensated.

Figure 1:
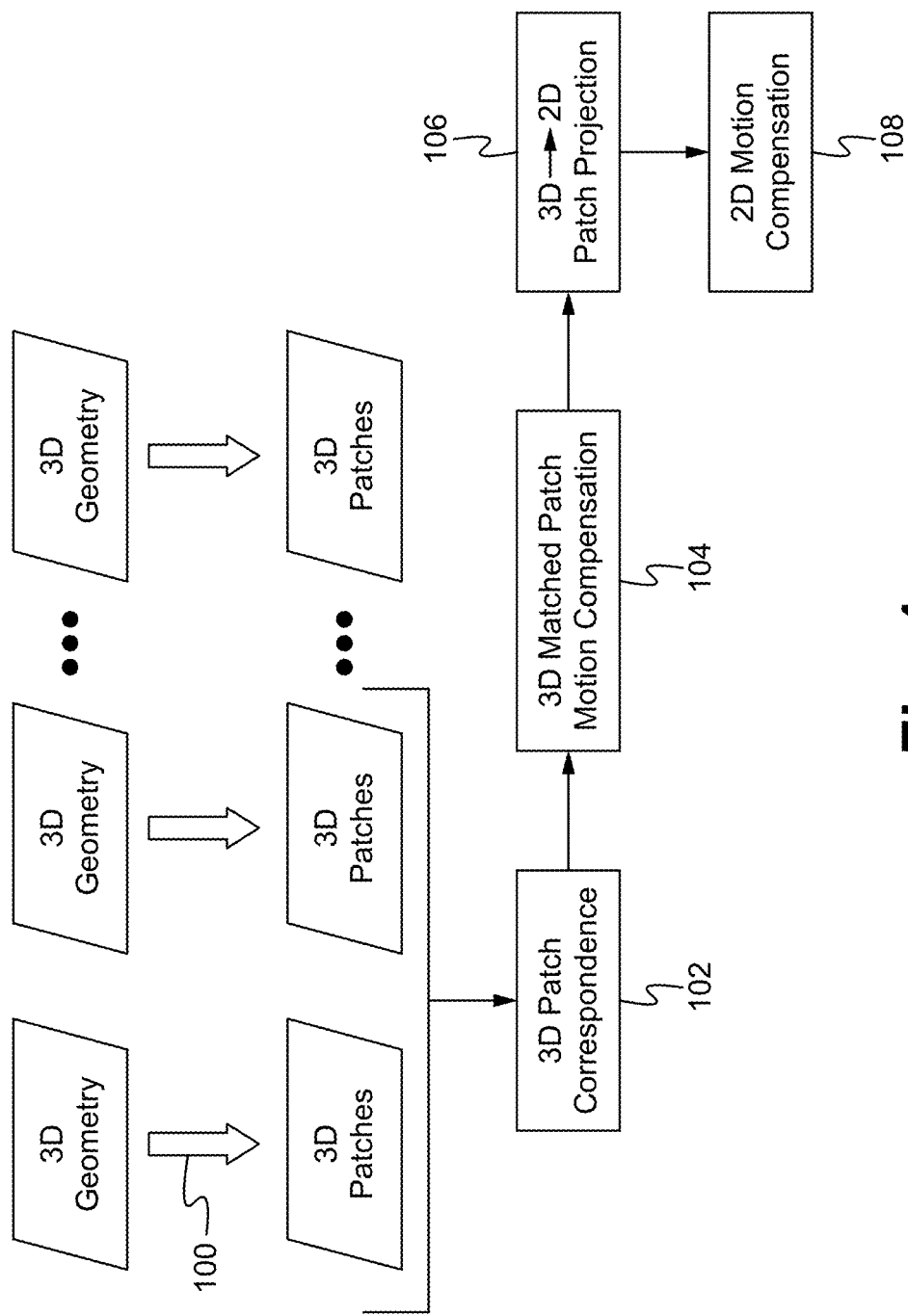
FIG. 1 illustrates a flowchart of a method of implementing motion compensation using 3D surface patches and 2D projections according to some embodiments.

FIG. 1 illustrates a flowchart of a method of implementing motion compensation using 3D surface patches and 2D projections according to some embodiments. The 3D geometries are a sequence of an initial point cloud (or other 3D data) (e.g., a point cloud for each instance in time). In the step 100, 3D patches are acquired/generated from the 3D geometry. The 3D patches describe the surface of the point cloud by identifying points that have similar properties. The points that have similar properties are the points that have similar normals (e.g., points that are pointing to the same location and are connected in 3D space). The 3D patches are able to be acquired/generated in any manner such as 3D patch generation from the standard for point cloud compression. For example, points connected on the surface of a 3D geometry are considered 3D patches (e.g., 3D points connected in space which cover part of a surface). For example, for a point cloud of a person, half of the person's face is one patch, and the other half of the person's face is a second patch. For every frame (or time instance), a 3D geometry is broken up into 3D patches. In the step 102, patch correspondence is implemented to determine which patches (from the different frames/time instances) correspond to each other. Instead of finding correspondence of points in a whole point cloud, correspondence is found for each patch. Described herein is a way to correlate patches from different frames/time instances. Using bounding boxes of the patches, it is able to be determined when Patch A from frame 1 corresponds to Patch B from frame 2. In the step 104, 3D matched patch motion compensation is performed. Although 3D patch correspondence determines which patches correspond to each other, it does not determine where the patches belong (e.g., where they have moved to). Since it has already been determined which patches correspond, this step involves placing the patches on a UV map in the appropriate location to compensate for motion as described herein. In other words, since the 3D object moved, the 3D matched patch motion compensation places/positions the patch in the next frame based on the movement. Motion compensation for the depth is also able to be implemented by determining a depth delta, and adding that value to the luminous value (or a value similar to the luminous value). In the step 106, 3D to 2D patch projection is utilized. As described herein, the 3D patch is able to be projected to the 2D UV domain, and the patch is able to be projected to the appropriate location using the motion compensation. In the step 108, 2D motion compensation is implemented. The bounding box may not be able to detect very fine detailed movements/motions. However, a video encoder calculates the motion of each block/macroblock, and is able to perform 2D motion compensation. In some embodiments, fewer or additional steps are implemented. In some embodiments, the order of the steps is modified.

Figure 2:
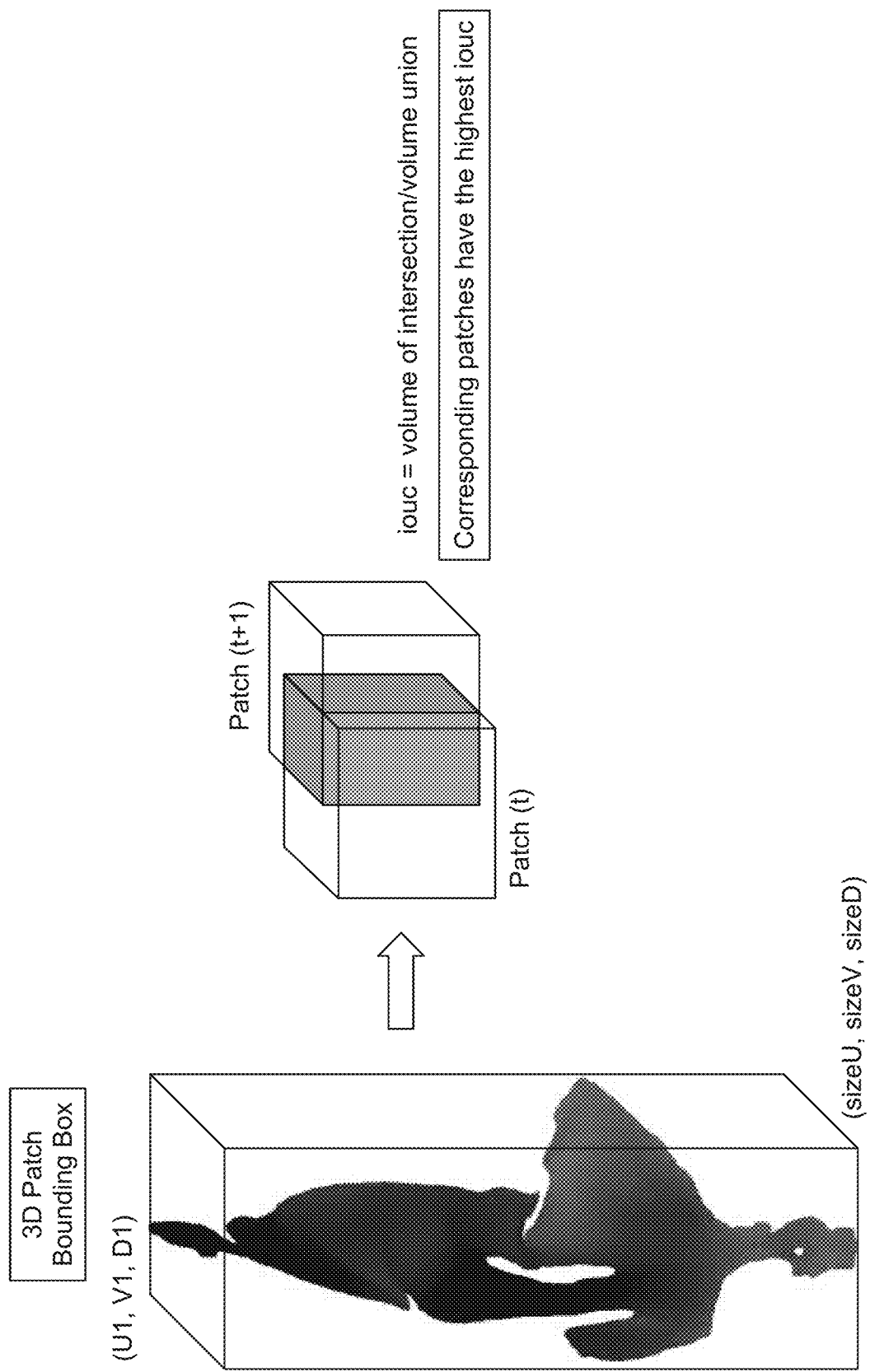
FIG. 2 illustrates a diagram of implementing 3D patch correspondence according to some embodiments.

FIG. 2 illustrates a diagram of implementing 3D patch correspondence according to some embodiments. The 3D patches are grayscale images with the luminous of the point which indicates the distance of the point to a reference point. For example, as shown in FIG. 2, a 3D patch bounding box has a back-left point of U1, V1, D1, and the bottom-right point of the bounding box is sizeU, sizeV, sizeD. Furthering the example, U and V are the 2D image dimensions of the grayscale image and D is the luminous value, making it a 3D patch. Every patch from the 3D geometry has a 3D bounding box. For example, for a first frame, several patches are generated, and every patch has a bounding box generated. Then, in the next frame, there are several different patches generated, and each of those patches has a bounding box. The way to correlate the bounding boxes from one frame to the bounding boxes of another frame is by determining an intersection of the bounding boxes from each frame. For example, a first bounding box from a first frame has an intersection with a second bounding box from a second frame. Furthering the example, if an object does not change or move much, then the bounding boxes from each frame will overlap entirely or close to entirely. The intersection of the bounding boxes corresponds to a volume. That volume is used as an indication of how well correlated the patches are. Corresponding patches have the highest iouc, where iouc equals volume of intersection divided by volume union. For example, if a first bounding box is from a front patch of a 3D geometry and a second bounding box is from a back patch of a 3D geometry, their intersection or iouc is going to be very small most likely as the patches are dissimilar, which means those patches are not correlated. In another example, if a first bounding box is from a front patch of a 3D geometry, and a second bounding box is from a front patch of a 3D geometry at a slightly later time, their intersection or iouc is going to be very high most likely as the patches are similar, which means those patches are correlated, which also means the patches represent the same or a similar surface of the 3D geometry. In other words, 3D patch correspondence is determined based on the intersection of the bounding boxes of the 3D patches. In some embodiments, the bounding boxes are able to be different sizes or a uniform size. In some embodiments, the bounding boxes include information as to the location of the patch.

FIG. 3 illustrates a diagram of 3D matched patch motion compensation according to some embodiments. The 3D patch information is projected onto a 2D domain (U, V). Even though it is the 2D domain, the 3D information is included. For example, if a 3D object moves, the bounding box of the patch will show that the patch has moved. Furthering the example, in FIG. 3 in Frame 0, U1, V1 is [105,143], and then in Frame 1, U1, V1 is [104,155], which shows that the object moved about 10-12 units (e.g., pixels) vertically. Therefore, the patch is able to be placed based on this movement, which is also referred to as motion compensation. Furthering the example, for frame (t+1), the patch is positioned based on the delta of [U1, V1] of the patch from t to t+1. Moving the patch in the UV domain is equivalent to performing motion compensation of the 3D patch.

Figure 4:
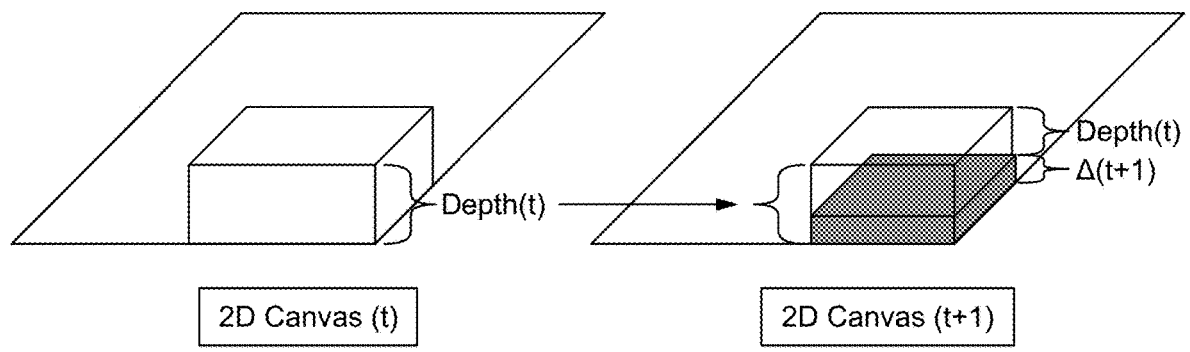
FIG. 4 illustrates a diagram of 3D patch motion compensation—depth translation according to some embodiments.

FIG. 4 illustrates a diagram of 3D patch motion compensation—depth translation according to some embodiments. The 3D patch motion compensation described above only moves the patch in the x and y directions. However, the patch (which is a 3D patch) is able to move in the z direction as well. The motion in the z direction corresponds to a depth translation which corresponds to a value added to the grayscale. Depth translation enables the patch to be moved in the z direction. For example, an original patch has a depth(t), and then at depth(t+1), the patch has moved a delta amount. The delta is able to be compensated for by adding the value to the luminous value (or a similar value).

Figure 5:
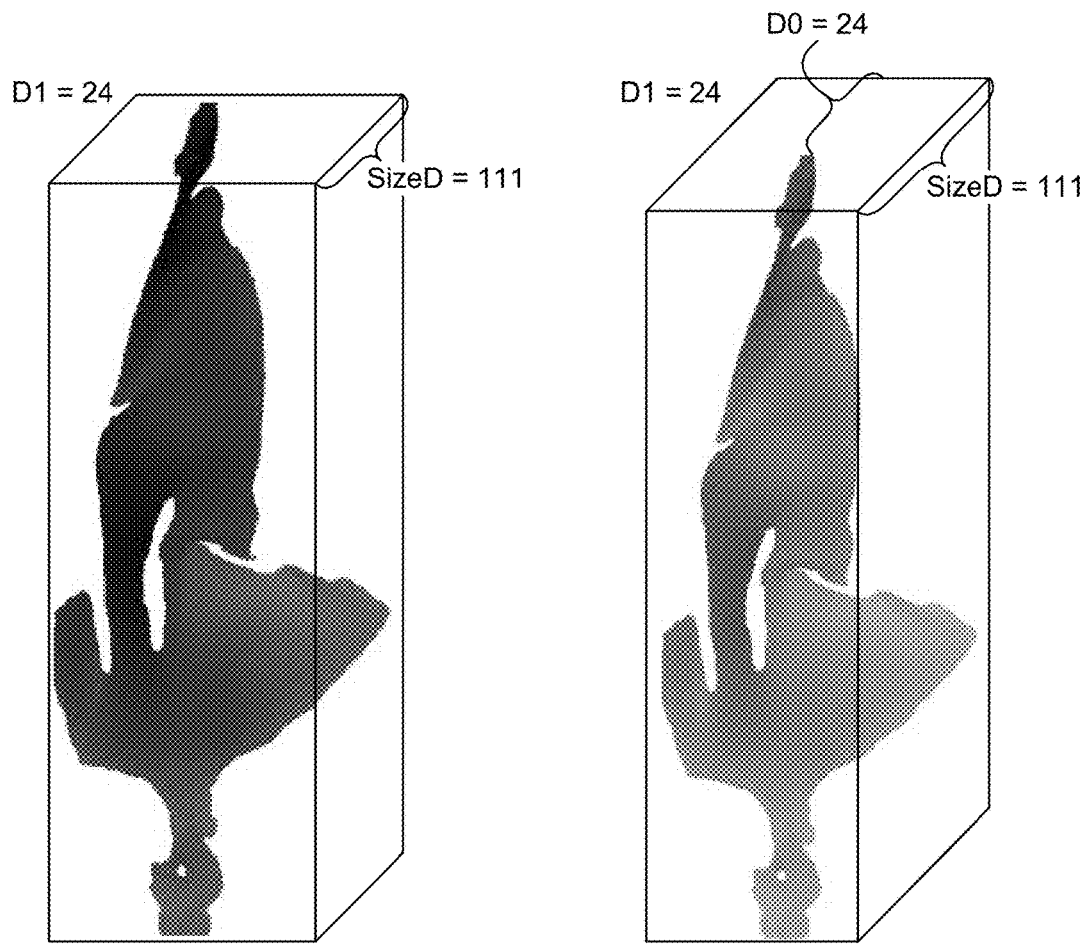
FIG. 5 illustrates a diagram of luminance adjustment according to some embodiments.

FIG. 5 illustrates a diagram of luminance adjustment according to some embodiments. As described in FIG. 4, the luminance is able to be adjusted per patch to always have a specified mean value (e.g., around 128). In some embodiments, the delta from the current value and the mean value is able to be sent to an occupancy map or other data structure.

Included herein is exemplary code regarding the luminance adjustment:

| group_of_frames_auxilary_information( ) { | Descriptor |
|---|---|
| patch_count | u(32) |
| occupancy_precision | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |
| ByteCount+=15 | |
| for(i = 0; i<patchCount; i++) { | |
|   patchList[i].patch_u0 | ae(v) |
|   patchList[i].patch_v0 | ae(v) |
|   patchList[i].patch_u1 | ae(v) |
|   patchList[i].patch_v1 | ae(v) |
|   patchList[i].patch_d1 | ae(v) |
|   patchList[i].delta_size_u0 | se(v) |
|   patchList[i].delta_size_v0 | se(v) |
|   patchList[i].normal_axis | ae(v) |
| } | |
| for (i=0; i<blockCount; i++) { | |
|   if(candidatePatches[i].size( ) == 1) | |
|     blockToPatch[i] = candidatePatches[i][0] | |
|   else { | |
|     candidate_index | ae(v) |
|     if(candidate_index == max_candidate_count) | |
|       blockToPatch[i] = patch_index | ae(v) |
|     else | |
|       blockToPatch[i] = candidatePatches[i][candidate_index] | |
|   } | |
| } | |
| ByteCount += occupancy_auxilary_stream_size | |
| } | |

Figure 6:
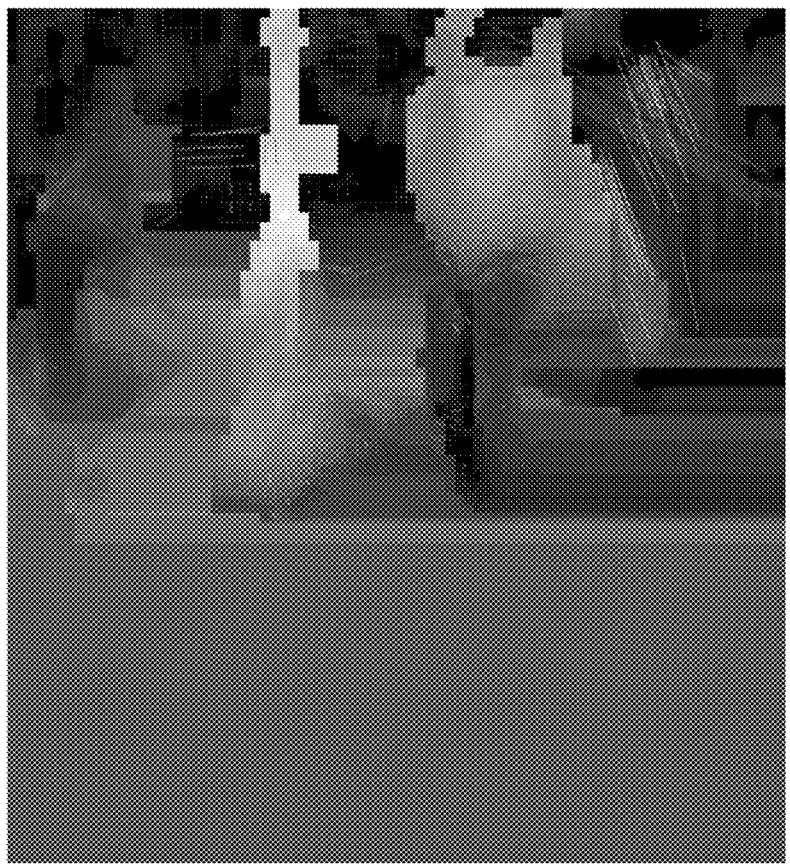
FIG. 6 illustrates a diagram of 2D motion estimation of a sequence of projected patches according to some embodiments.

FIG. 6 illustrates a diagram of 2D motion estimation of a sequence of projected patches according to some embodiments. As described above, the 3D motion compensation is rough since 3D blocks are utilized. The rest of the motion is able to be captured by the video encoder. In other words, the fine motion of the 3D object is captured by the HEVC or other encoder.

In some embodiments, normative pseudo-motion compensation is used for patches. For example, the motion compensation described FIG. 3 is able to include normative pseudo-motion compensation. By using normative pseudo-motion compensation, differential information is able to be sent for matched patches. Exemplary code is shown herewith:

| group_of_frames_auxilary_information( ) { | Descriptor |
|---|---|
| patch_count | u(32) |
| occupancy_precision | u(8) |
| max_candidate_Count | u(8) |
| bit_count_u0 | u(8) |
| bit_count_v0 | u(8) |
| bit_count_u1 | u(8) |
| bit_count_v1 | u(8) |
| bit_count_d1 | u(8) |

-continued

```
group_of_frames_auxilary_information( ) {              Descriptor occupancy_aux_stream_size                          u(32)
    ByteCount+=15
    for(i = 0; i<patchCount; i++) {
      if(patchList[i] is matched)
        matched_flag(1)                                ae(1)
        patchList[i].matchedId                         ae(v)
        patchList[i].patch_u0 - matchedPatch.patch_u0  ae(v)
        patchList[i].patch_v0 - matchedPatch.patch_v0  ae(v)
        patchList[i].patch_u1 - matchedPatch.patch_u1  ae(v)
        patchList[i].patch_v1 - matchedPatch.patch_v1  ae(v)
        patchList[i].patch_d1 - matchedPatch.patch_d1  ae(v)
        patchList[i].size_u0 - matchedPatch.patch_u0   se(v)
        patchList[i].size_v0 - matchedPatch.patch_v0   se(v)
      }
      else {
        unmatch_flag (0)
        patchList[i].patch_u0                          ae(1)
        patchList[i].patch_v0                          ae(v)
        patchList[i].patch_u1                          ae(v)
        patchList[i].patch_v1                          ae(v)
        patchList[i].patch_d1                          ae(v)
        patchList[i].delta_size_u0                     se(v)
        patchList[i].delta_size_v0                     se(v)
        patchList[i].normal_axis                       ae(v)
      }
    }
}
```

Figure 7:
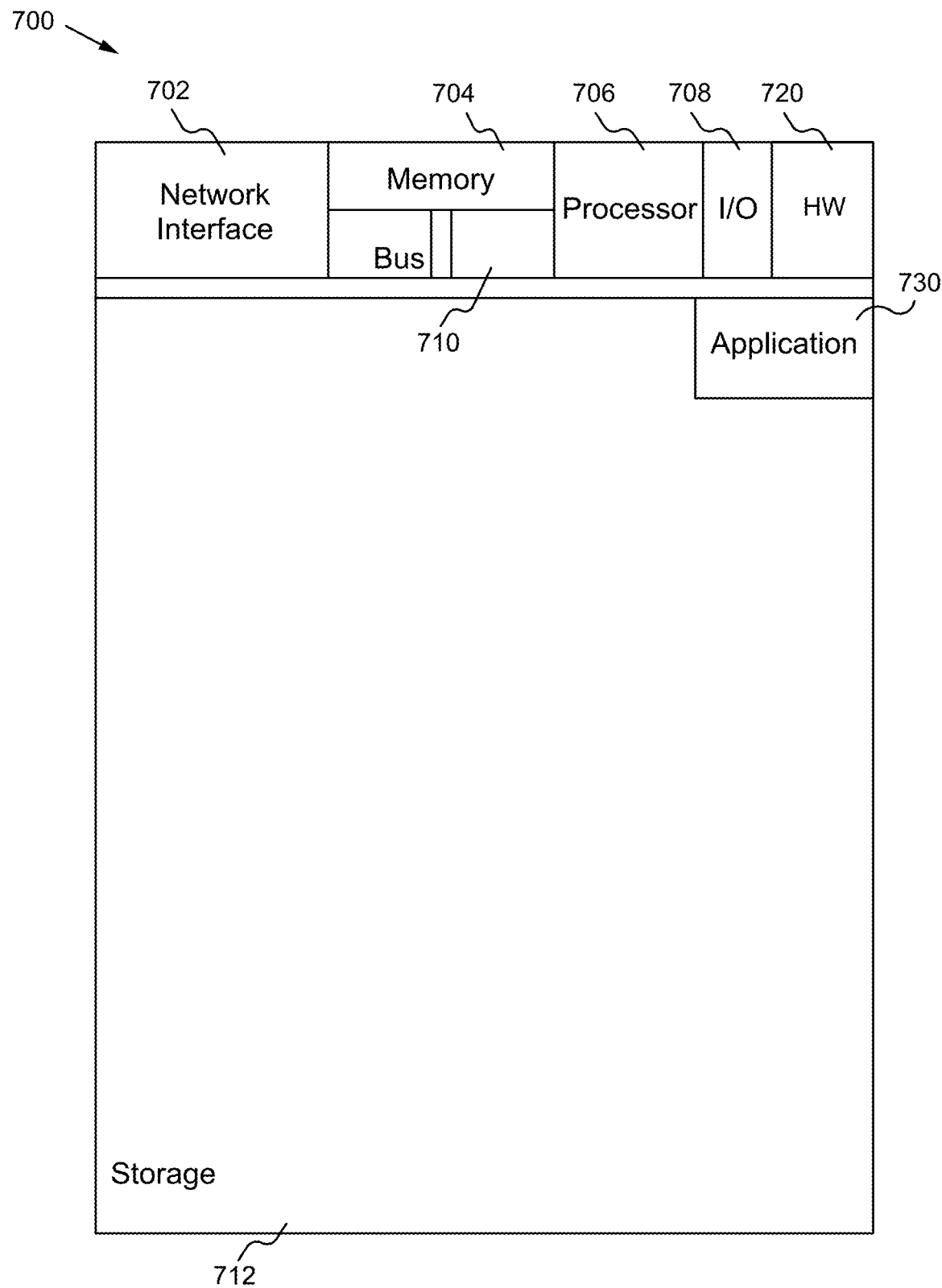
FIG. 7 illustrates a block diagram of an exemplary computing device configured to implement the motion compensation method according to some embodiments.

FIG. 7 illustrates a block diagram of an exemplary computing device configured to implement the motion compensation method according to some embodiments. The computing device 700 is able to be used to acquire, store, compute, process, communicate and/or display information such as images and videos including 3D content. The computing device 700 is able to implement any of the motion compensation method aspects. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, screen, printer, modem, touchscreen, button interface and other devices. Motion compensation application(s) 730 used to implement the motion compensation method are likely to be stored in the storage device 712 and memory 704 and processed as applications are typically processed. More or fewer components shown in FIG. 7 are able to be included in the computing device 700. In some embodiments, motion compensation hardware 720 is included. Although the computing device 700 in FIG. 7 includes applications 730 and hardware 720 for the motion compensation method, the motion compensation method is able to be implemented on a computing device in hardware, firmware, software or any combination thereof. For example, in some embodiments, the motion compensation applications 730 are programmed in a memory and executed using a processor. In another example, in some embodiments, the motion compensation hardware 720 is programmed hardware logic including gates specifically designed to implement the motion compensation method.

In some embodiments, the motion compensation application(s) 730 include several applications and/or modules. In some embodiments, modules include one or more sub-modules as well. In some embodiments, fewer or additional modules are able to be included.

In some embodiments, the motion compensation hardware 720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the motion compensation method described herein, a device acquires or receives 3D content and processes and/or sends the content in an optimized manner to enable proper, efficient display of the 3D content. The motion compensation method is able to be implemented with user assistance or automatically without user involvement.

In operation, the motion compensation method more efficiently processes 3D content including compressing the data such that much less information is sent.

Some Embodiments of Motion Compensation of Geometry Information

1. A method programmed in a non-transitory memory of a device comprising:
   generating 3D patches from a 3D geometry;
   determining corresponding 3D patches between time instances;
   implementing 3D matched patch motion compensation using the corresponding 3D patches;
   projecting the corresponding 3D patches onto a 2D canvas image; and
   implementing 2D motion compensation using a sequence of 2D canvas images.
2. The method of clause 1 wherein generating the 3D patches includes determining points connected on a surface of the 3D geometry.
3. The method of clause 1 wherein determining corresponding 3D patches between time instances includes identifying temporal correspondences between patches by evaluating a volume intersection of a cube created by a 3D bounding box of each 3D patch.
4. The method of clause 1 wherein implementing 3D matched patch motion compensation includes positioning the corresponding 3D patches on a UV map in a location to compensate for motion.
5. The method of clause 1 wherein projecting the 3D patches onto the 2D canvas includes placing the corresponding 3D patches onto the 2D canvas so that the matching coordinates in 3D correspond to the same location in 2D after projection.
6. The method of clause 1 wherein the similarity of correspondent patch data is increased by adjusting a depth of a 3D patch.

7. The method of clause 1 wherein after implementing the 3D matched patch motion compensation and implementing the 2D motion compensation a motion compensated 3D geometry is established.

8. An apparatus comprising:
   a non-transitory memory for storing an application, the application for:
   generating 3D patches from a 3D geometry;
   determining corresponding 3D patches between time instances;
   implementing 3D matched patch motion compensation using the corresponding 3D patches;
   projecting the corresponding 3D patches onto a 2D canvas image; and
   implementing 2D motion compensation using a sequence of 2D canvas images; and
   a processor coupled to the memory, the processor configured for processing the application.

9. The apparatus of clause 8 wherein generating the 3D patches includes determining points connected on a surface of the 3D geometry.

10. The apparatus of clause 8 wherein determining corresponding 3D patches between time instances includes identifying temporal correspondences between patches by evaluating a volume intersection of a cube created by a 3D bounding box of each 3D patch.

11. The apparatus of clause 8 wherein implementing 3D matched patch motion compensation includes positioning the corresponding 3D patches on a UV map in a location to compensate for motion.

12. The apparatus of clause 8 wherein projecting the 3D patches onto the 2D canvas includes placing the corresponding 3D patches onto the 2D canvas so that the matching coordinates in 3D correspond to the same location in 2D after projection.

13. The apparatus of clause 8 wherein the similarity of correspondent patch data is increased by adjusting a depth of a 3D patch.

14. The apparatus of clause 8 wherein after implementing the 3D matched patch motion compensation and implementing the 2D motion compensation a motion compensated 3D geometry is established.

15. A system comprising:
   a generation module configured for generating 3D patches from a 3D geometry;
   a corresponding module configured for determining corresponding 3D patches between time instances;
   a 3D matched motion compensation module configured for implementing 3D matched patch motion compensation using the corresponding 3D patches;
   a projection module configured for projecting the corresponding 3D patches onto a 2D canvas image; and
   a 2D motion compensation module configured for implementing 2D motion compensation using a sequence of 2D canvas images.

16. The system of clause 15 wherein generating the 3D patches includes determining points connected on a surface of the 3D geometry.

17. The system of clause 15 wherein determining corresponding 3D patches between time instances includes identifying temporal correspondences between patches by evaluating a volume intersection of a cube created by a 3D bounding box of each 3D patch.

18. The system of clause 15 wherein implementing 3D matched patch motion compensation includes positioning the corresponding 3D patches on a UV map in a location to compensate for motion.

19. The system of clause 15 wherein projecting the 3D patches onto the 2D canvas includes placing the corresponding 3D patches onto the 2D canvas so that the matching coordinates in 3D correspond to the same location in 2D after projection.

20. The system of clause 15 wherein the similarity of correspondent patch data is increased by adjusting a depth of a 3D patch.

21. The system of clause 15 wherein after implementing the 3D matched patch motion compensation and implementing the 2D motion compensation a motion compensated 3D geometry is established.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   generating 3D patches from a 3D geometry;
   determining corresponding 3D patches between time instances;
   implementing 3D matched patch motion compensation using the corresponding 3D patches, wherein implementing 3D matched patch motion compensation includes positioning the corresponding 3D patches on a UV map in a location to compensate for motion including positioning a 3D patch for frame at a time t+1 based on a delta of UV of the 3D patch from time t to time t+1, wherein implementing 3D matched patch motion compensation includes adding a value to a luminous value based on the delta;
   projecting the corresponding 3D patches onto a 2D canvas image; and
   implementing 2D motion compensation using a sequence of 2D canvas images.

2. The method of claim 1 wherein generating the 3D patches includes determining points connected on a surface of the 3D geometry.

3. The method of claim 1 wherein determining corresponding 3D patches between time instances includes identifying temporal correspondences between patches by evaluating a volume intersection of a cube created by a 3D bounding box of each 3D patch.

4. The method of claim 1 wherein projecting the 3D patches onto the 2D canvas includes placing the corresponding 3D patches onto the 2D canvas so that the matching coordinates in 3D correspond to the same location in 2D after projection.

5. The method of claim 1 wherein the similarity of correspondent patch data is increased by adjusting a depth of a 3D patch.

6. The method of claim 1 wherein after implementing the 3D matched patch motion compensation and implementing the 2D motion compensation a motion compensated 3D geometry is established.

7. An apparatus comprising:
a non-transitory memory for storing an application, the application for:
   generating 3D patches from a 3D geometry;
   determining corresponding 3D patches between time instances;
   implementing 3D matched patch motion compensation using the corresponding 3D patches, wherein implementing 3D matched patch motion compensation includes positioning the corresponding 3D patches on a UV map in a location to compensate for motion including positioning a 3D patch for frame at a time t+1 based on a delta of UV of the 3D patch from time t to time t+1, wherein implementing 3D matched patch motion compensation includes adding a value to a luminous value based on the delta;
   projecting the corresponding 3D patches onto a 2D canvas image; and
   implementing 2D motion compensation using a sequence of 2D canvas images; and
a processor coupled to the memory, the processor configured for processing the application.

8. The apparatus of claim 7 wherein generating the 3D patches includes determining points connected on a surface of the 3D geometry.

9. The apparatus of claim 7 wherein determining corresponding 3D patches between time instances includes identifying temporal correspondences between patches by evaluating a volume intersection of a cube created by a 3D bounding box of each 3D patch.

10. The apparatus of claim 7 wherein projecting the 3D patches onto the 2D canvas includes placing the corresponding 3D patches onto the 2D canvas so that the matching coordinates in 3D correspond to the same location in 2D after projection.

11. The apparatus of claim 7 wherein the similarity of correspondent patch data is increased by adjusting a depth of a 3D patch.

12. The apparatus of claim 7 wherein after implementing the 3D matched patch motion compensation and implementing the 2D motion compensation a motion compensated 3D geometry is established.

13. A system comprising:
a generation module configured for generating 3D patches from a 3D geometry;
a corresponding module configured for determining corresponding 3D patches between time instances;
a 3D matched motion compensation module configured for implementing 3D matched patch motion compensation using the corresponding 3D patches, wherein implementing 3D matched patch motion compensation includes positioning the corresponding 3D patches on a UV map in a location to compensate for motion including positioning a 3D patch for frame at a time t+1 based on a delta of UV of the 3D patch from time t to time t+1, wherein implementing 3D matched patch motion compensation includes adding a value to a luminous value based on the delta;
a projection module configured for projecting the corresponding 3D patches onto a 2D canvas image; and
a 2D motion compensation module configured for implementing 2D motion compensation using a sequence of 2D canvas images.

14. The system of claim 13 wherein generating the 3D patches includes determining points connected on a surface of the 3D geometry.

15. The system of claim 13 wherein determining corresponding 3D patches between time instances includes identifying temporal correspondences between patches by evaluating a volume intersection of a cube created by a 3D bounding box of each 3D patch.

16. The system of claim 13 wherein projecting the 3D patches onto the 2D canvas includes placing the corresponding 3D patches onto the 2D canvas so that the matching coordinates in 3D correspond to the same location in 2D after projection.

17. The system of claim 13 wherein the similarity of correspondent patch data is increased by adjusting a depth of a 3D patch.

18. The system of claim 13 wherein after implementing the 3D matched patch motion compensation and implementing the 2D motion compensation a motion compensated 3D geometry is established.

19. The system of claim 13 wherein determining corresponding 3D patches between time instances includes determining a highest volume of intersection divided by volume union.

* * * * *